(12) United States Patent
Um et al.

(10) Patent No.: US 7,302,144 B2
(45) Date of Patent: Nov. 27, 2007

(54) INDOOR OPTICAL FIBER CABLE

(75) Inventors: Eun-Song Um, Gumi-si (KR); Jin-Han Kim, Gumi-si (KR)

(73) Assignee: Samsung Electronics Co., Ltd., Maetan-Dong, Yeong Tong-Gu, Suwon-si, Gyeonggi-Do (KR)

( * ) Notice: Subject to any disclaimer, the term of this patent is extended or adjusted under 35 U.S.C. 154(b) by 0 days.

(21) Appl. No.: 11/224,152

(22) Filed: Sep. 12, 2005

(65) Prior Publication Data

US 2006/0147165 A1    Jul. 6, 2006

(30) Foreign Application Priority Data

Jan. 4, 2005    (KR)    ................. 10-2005-0000587

(51) Int. Cl.
*G02B 6/44*    (2006.01)
(52) U.S. Cl. ...................................... 385/100; 385/113
(58) Field of Classification Search ......... 385/100–114
See application file for complete search history.

(56) References Cited

U.S. PATENT DOCUMENTS

| | | | | |
|---|---|---|---|---|
| 4,723,831 A | * | 2/1988 | Johnson et al. | ............. 385/111 |
| 6,654,527 B2 | * | 11/2003 | Sakabe et al. | ............... 385/114 |
| 6,963,686 B2 | * | 11/2005 | Moon | ........................ 385/113 |
| 2003/0072545 A1 | * | 4/2003 | Kusakari et al. | ............. 385/101 |
| 2006/0045442 A1 | * | 3/2006 | Varkey et al. | ............... 385/102 |

FOREIGN PATENT DOCUMENTS

| KR | 1998-20115 | 6/1998 |
|---|---|---|
| KR | 2003-41679 | 5/2003 |
| KR | 2004-76425 | 9/2004 |
| KR | 2004-102394 | 12/2004 |

OTHER PUBLICATIONS

Derwent Abstract with Patent Family Publication Data of Moon (U.S. 6,963,686 & KR 2004-102394).*

* cited by examiner

*Primary Examiner*—Quyen Leung
(74) *Attorney, Agent, or Firm*—Cha & Reiter, LLC

(57) ABSTRACT

An indoor optical fiber cable including a plurality of optical fiber elements, which are optical transmission media; sheath deployed in the outermost of the indoor optical fiber cable to envelop the optical fiber elements; and a first peripheral strength member (PSM) embedded in the sheath, wherein the indoor optical fiber cable does not include a central strength member (CSM) deployed in the center.

6 Claims, 4 Drawing Sheets

INDOOR OPTICAL FIBER CABLE

CLAIM OF PRIORITY

This application claims priority under 35 U.S.C. § 119 to an application entitled "Indoor Optical Fiber Cable," filed in the Korean Intellectual Property Office on Jan. 4, 2005 and assigned Serial No. 2005-587, the contents of which are incorporated herein by reference.

BACKGROUND OF THE INVENTION

1. Field of the Invention

The present invention relates generally to optical fiber cable and in particular, to an indoor optical fiber cable without a central strength member.

2. Description of the Related Art

As a result of development in the industry and growing demands for more information at higher speed, an era of fiber to the home (FTTH) in has come to play. Various methods have been used to lay an indoor optical fiber cable in a building. Among the methods, a method of directly pulling cable, connecting the indoor optical fiber cable to existing copper cable, and laying the indoor optical fiber cable by pulling the copper cable out have been used.

While the copper serves as a strength member (SM) in the copper cable, optical fibers cannot play a major role of the SM in the optical fiber cable, thus requiring an additional central strength member (CSM) or SM.

FIG. 1 is a sectional diagram of a conventional optical fiber cable 100 including a CSM 110. As shown, the optical fiber cable 100 includes the CSM 110 deployed in the center, a plurality of optical fiber elements 120 wound in a spiral shape around the CSM 110, sheath 140 deployed in the outermost of the optical fiber cable 100 to envelop the CSM 110 and the optical fiber elements 120, and a SM 130 filled in a space inside the sheath 140 to surround the CSM 110 and the optical fiber elements 120.

However, since the optical fiber cable 100 uses steel wire or fiberglass reinforced plastic (FRP) having a very high elastic modulus as the CSM 110, it is difficult to bend the optical fiber cable 100 including the CSM 110, thereby requiring a very high pull tension in the installation environment or disabling the installation of the optical fiber cable 100. As such, it is common for the optical fiber cable not to include a CSM as an installation route of the optical fiber cable is complex and coarse.

FIGS. 2A and 2B illustrate a conventional indoor optical fiber cable 200 without a CSM. In particular, FIG. 2A is a sectional diagram of the indoor optical fiber cable 200, and FIG. 2B is a side view of the indoor optical fiber cable 200.

Referring to FIGS. 2A and 2B, the indoor optical fiber cable 200 includes a plurality of optical fiber elements 210, which are optical transmission media, sheath 230 deployed in the outermost of the indoor optical fiber cable 200 to envelop the optical fiber elements 210, and a peripheral strength member (PSM) 220 filled in a space inside the sheath 230 to surround the optical fiber elements 210.

However, the sheath 230 of the indoor optical fiber cable 200 may be easily stretched when a strong pull tension is applied during the installation or when the indoor optical fiber cable 200 is stuck in an installation route.

FIGS. 3A and 3B illustrate a stretched state of the indoor optical fiber cable 200. In particular, FIG. 3A is a sectional diagram of the stretched indoor optical fiber cable 200, and FIG. 3B is a side view of the stretched indoor optical fiber cable 200.

Referring to FIGS. 3A and 3B, when the sheath 230 is stretched, an inside diameter of the indoor optical fiber cable 200 is reduced, thus reducing a space between the optical fiber elements 210. At this time, since the optical fiber elements 210 is compressed by the SM 220 and the sheath 230, an increase of an optical loss may be caused, and if there exists an additional stress from the outside, the optical loss may be more increased.

In addition, if the sheath 230 contracts due to a drop in temperature in a state of the stretched sheath 230, the inside diameter of the sheath 230 is reduced further, thus increasing the optical loss of the optical fiber elements 210.

As described above, for the typical indoor optical fiber cable 200 without a CSM, an information transmission characteristic can be deteriorated due to the stretch effect of the sheath 230.

SUMMARY OF THE INVENTION

An object of the present invention is to substantially solve at least the above problems and/or disadvantages and to provide at least the advantages below. Accordingly, an object of the present invention is to provide an indoor optical fiber cable that can guarantee a stable information transmission characteristic by making installation easy due to non-use of a central strength member (CSM) inside the cable and minimizing a stretch of sheath due to the non-use of the CSM.

In one embodiment, there is provided an indoor optical fiber cable comprising: a plurality of optical fiber elements, each of which serves as an optical transmission medium; sheath deployed in the outermost of the indoor optical fiber cable to envelop the optical fiber elements; and a first peripheral strength member (PSM) embedded in the sheath, wherein the indoor optical fiber cable does not include a central strength member (CSM) deployed in the center.

BRIEF DESCRIPTION OF THE DRAWINGS

The above features and advantages of the present invention will become more apparent from the following detailed description when taken in conjunction with the accompanying drawings in which.

DETAILED DESCRIPTION

Embodiments of the present invention will be described herein below with reference to the accompanying drawings. For the purposes of clarity and simplicity, well-known functions or constructions are not described in detail as they would obscure the invention in unnecessary detail.

Figure 4:
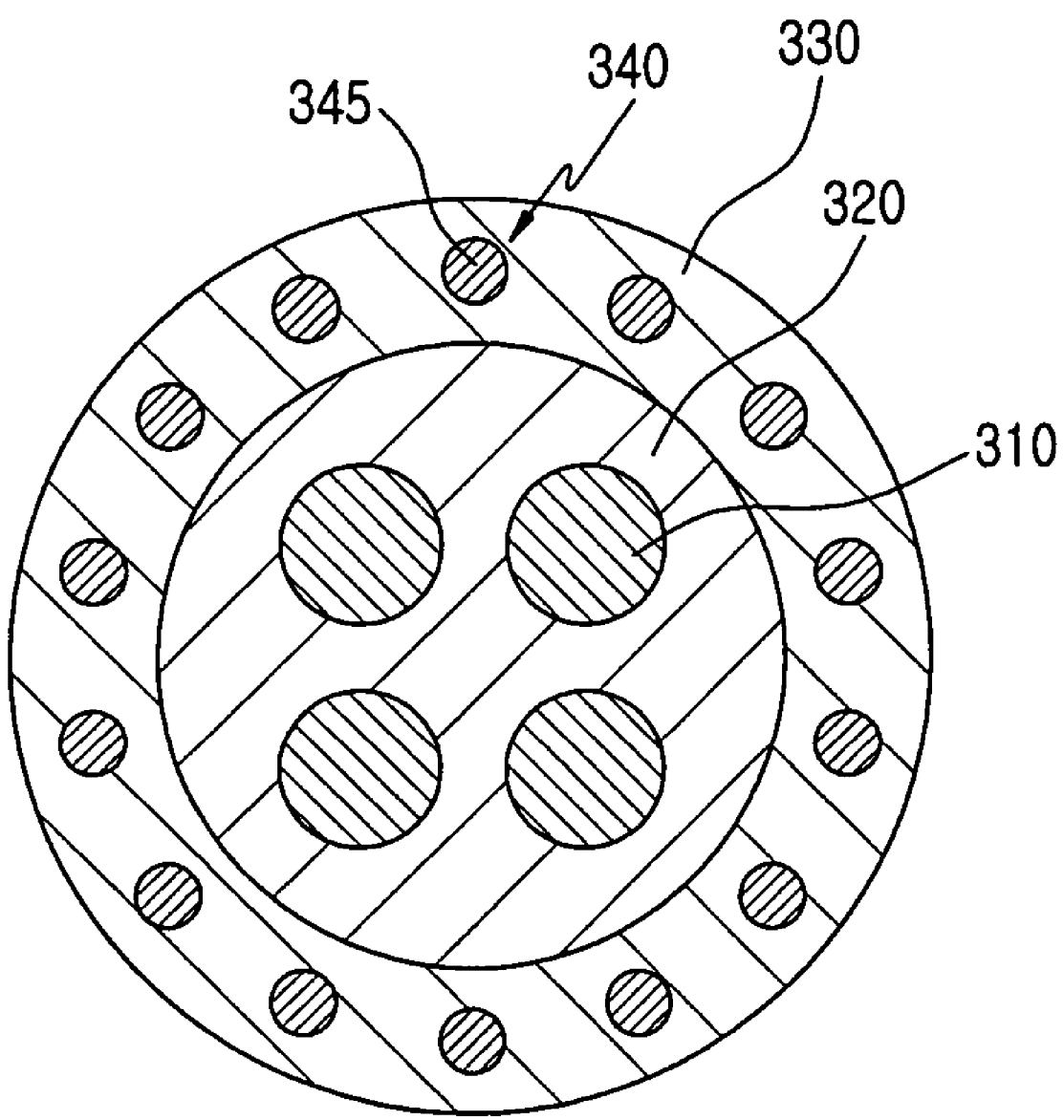
FIG. 4 is a sectional diagram of an indoor optical fiber cable without a CSM according to a preferred embodiment of the present invention.

FIG. 4 is a sectional diagram of an indoor optical fiber cable 300 without a central strength member (CSM) according to an embodiment of the present invention. As shown, the indoor optical fiber cable 300 includes a plurality of optical fiber elements 310, first and second peripheral strength members (PSMs) 340 and 320, and sheath 330.

The optical fiber elements 310 are optical transmission mediums which may be an optical fiber, a buffered optical fiber, a ribbon optical fiber or a loose tube. That is, the optical fiber element 310 is a bare optical fiber which may be: a core of a typical glass material and a clad, a resin coated bare optical fiber (this type is typically called the optical fiber), a colored optical fiber for easy identification, a plastic press coated optical fiber (this is called the buffered optical fiber), one body formed by resin-coating a plurality of optical fiber (this is called the ribbon optical fiber), or obtained by installing the colored optical fiber or the ribbon optical fiber in a jelly compound filled plastic tube (this is called the loose tube).

The sheath 330 envelops the optical fiber elements 310 and is deployed in the outermost part of the indoor optical fiber cable 300. The sheath 330 may be made of a plastic material, e.g., polyethylene (PE), ethylene vinyl acetate copolymer (EVA), or polyvinyl chloride. It is preferable that an oxygen index of the sheath 330 is more than 28% to guarantee a sufficient flame retardant characteristic. The oxygen index is a non-dimensional value of a limit oxygen density in which a flammable solid can catch fire, called a limit oxygen index (LOI). The sheath 330 can contain halogen compounds, aluminum hydroxide or magnesium hydroxide to increase the oxygen index. The sheath 330 can be processed to have a broken surface to decrease its coefficient of friction (i.e., to be easily installed).

The first PSM 340 includes a plurality of peripheral strength units 345 embedded in the sheath 330 and deployed with a predetermined gap in the sheath 330. It is preferable that the first PSM 340 includes at least four peripheral strength units 345 symmetrically deployed based on the center of the indoor optical fiber cable 300 to provide a sufficient tensile strength. Each peripheral strength unit 345 may be peripheral strength yarn, such as aramid yarn, glass yarn, or resin coated peripheral strength yarn.

The second PSM 320 is deployed in a space inside the sheath 330 to surround the optical fiber elements 310. The second PSM 320 includes a plurality of peripheral strength units and fully fills in the space inside the sheath 330. Each peripheral strength unit may be peripheral strength yarn such as aramid yarn, glass yarn. For the second PSM 320 to have water resistance, each peripheral strength unit also may be super absorbent powder coated aramid yarn or glass yarn, water swellable yarn, or a combination of aramid yarn.

The first PSM 340 prevents the sheath 330 from being stretched, and the second PSM 320 provides a tensile strength to the indoor optical fiber cable 300 with the first PSM 340 together.

Figure 1:
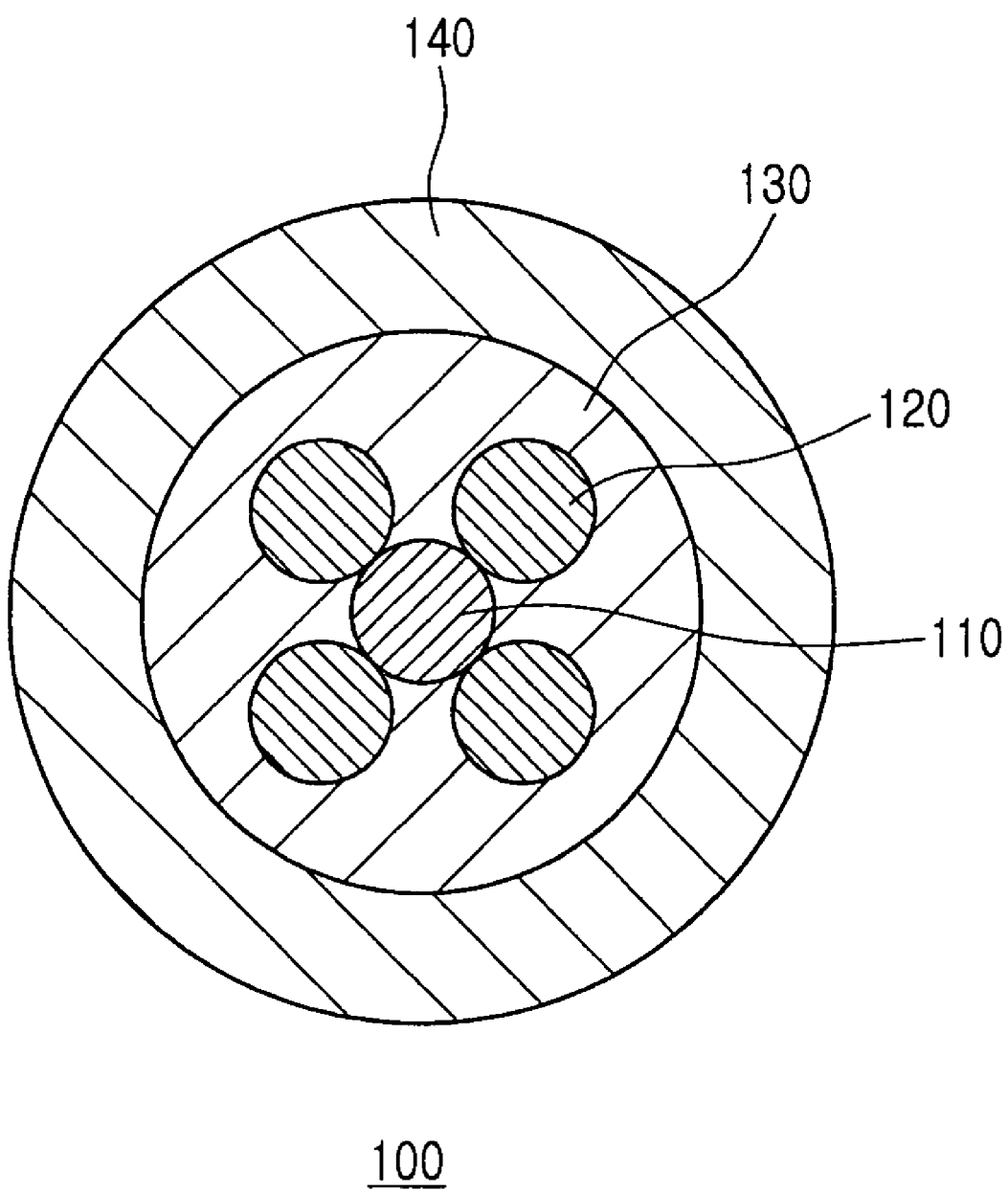
FIG. 1 is a sectional diagram of a typical optical fiber cable including a CSM.
Figure 2A:
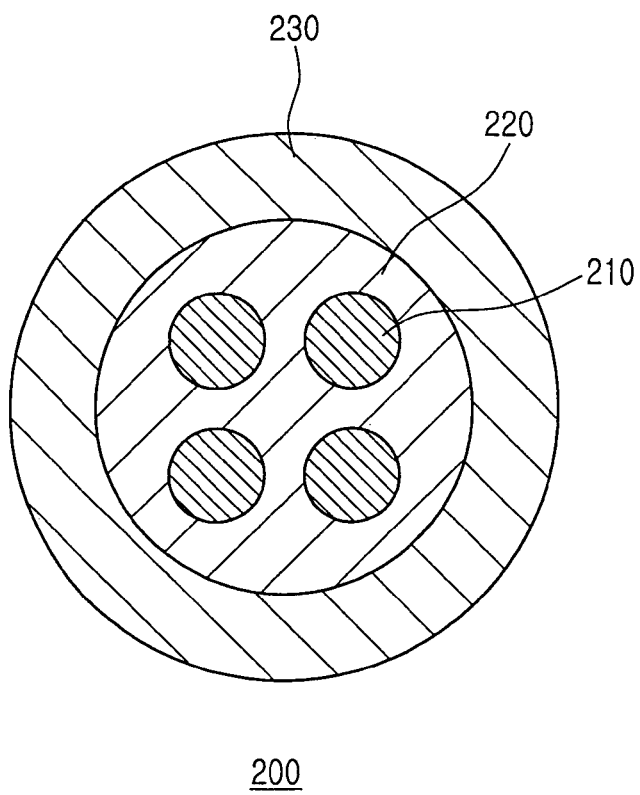
FIGS. 2A and 2B illustrate a typical indoor optical fiber cable without a CSM.
Figure 2B:
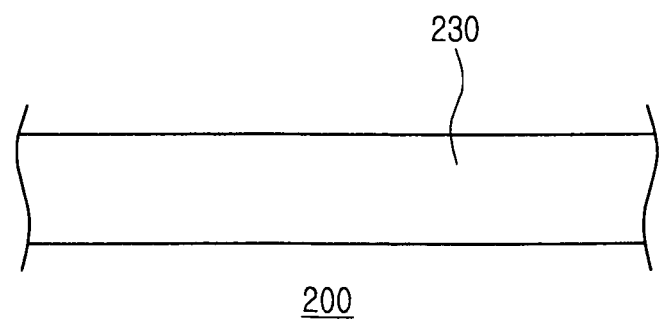
Figure 3A:
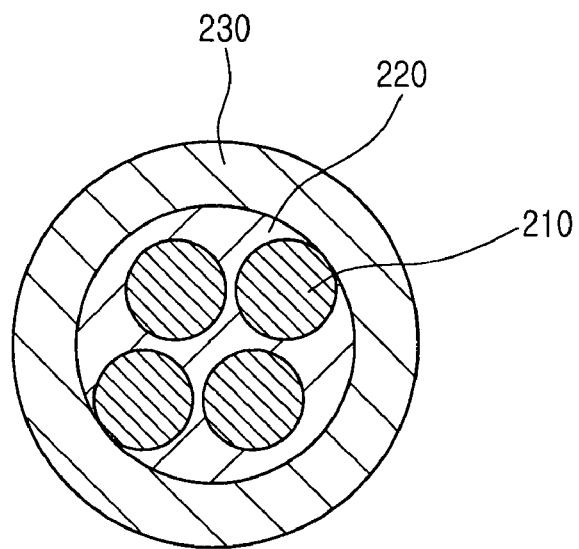
FIGS. 3A and 3B illustrate a stretched state of the indoor optical fiber cable shown in FIGS. 2A and 2B.
Figure 3B:
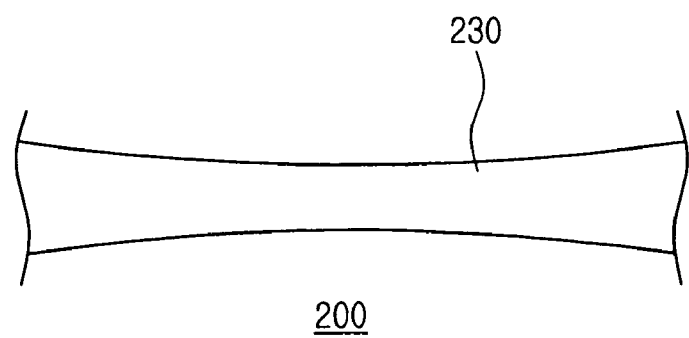

Table 1 shows comparison results obtained by performing a tensile experiment on the sheath 330 of the indoor optical fiber cable 300 and the sheath 230 of the conventional indoor optical fiber cable 200 shown in FIGS. 2A and 2B. The tensile experiment is performed using commercialized instron.

TABLE 1

|  | Present embodiment | | Prior art | |
|---|---|---|---|---|
|  | Weight (kg · f) | Distortion factor (%) | Weight (kg · f) | Distortion factor (%) |
| Sample 1 | 43.33 | 2.73 | 8.38 | 48.22 |
| Sample 2 | 67.81 | 2.74 | 9.17 | 72.00 |
| Sample 3 | 45.46 | 2.73 | 8.82 | 49.85 |
| Sample 4 | 53.48 | 2.73 | 9.06 | 58.16 |
| Sample 5 | 40.40 | 2.74 | 9.48 | 74.78 |
| Max value | 67.81 | 2.74 | 9.48 | 74.78 |
| Min value | 40.40 | 2.73 | 8.38 | 48.22 |
| Mean value | 50.10 | 2.73 | 8.98 | 60.60 |

As shown in Table 1, while the sheath 230 of the conventional indoor optical fiber cable 200 without a CSM stretches around 50% with respect to a pull tension of around 8.5 kg, the sheath 330 of the conventional indoor optical fiber cable 300 including the first PSM 340 stretches around 3% with respect to the pull tension of around 50 kg.

As described above, an indoor optical fiber cable without a CSM according to an embodiment of the present invention embeds a first PSM in the sheath, thereby making installation of the cable easy and minimizing a stretch of the sheath.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An indoor optical fiber cable comprising:
   a plurality of optical fiber elements serving as an optical transmission medium;
   a sheath surrounding the optical fiber elements; and
   a first peripheral strength member (PSM) comprising at least four peripheral strength units embedded in the sheath and away from inner and outer circumferential surfaces of the sheath, wherein the units are spaced substantially equally apart from the center of the cable, wherein the adjacent units are circumferentially spaced equally apart from each other, and wherein the indoor optical fiber cable does not include a central strength member (CSM) at its center.

2. The indoor optical fiber cable of claim 1, further comprising a second PSM deployed within the inner circumferential surface of the sheath to surround the optical fiber elements.

3. The indoor optical fiber cable of claim 2, wherein the second PSM has a water resistance characteristic.

4. The indoor optical fiber cable of claim 1, wherein the peripheral strength units are symmetrically deployed based on the center of the indoor optical fiber cable.

5. The indoor optical fiber cable of claims 1, wherein the sheath has an oxygen index of more than 28%.

6. The indoor optical fiber cable of claim 1, wherein the sheath is made from a plastic material selected from a group of polyethylene (PB), ethylene vinyl acetate copolymer (EVA), or polyvinyl chloride.

* * * * *